(No Model.)
I. M. WARNER.
VEHICLE HUB AND AXLE.
No. 405,932. Patented June 25, 1889.
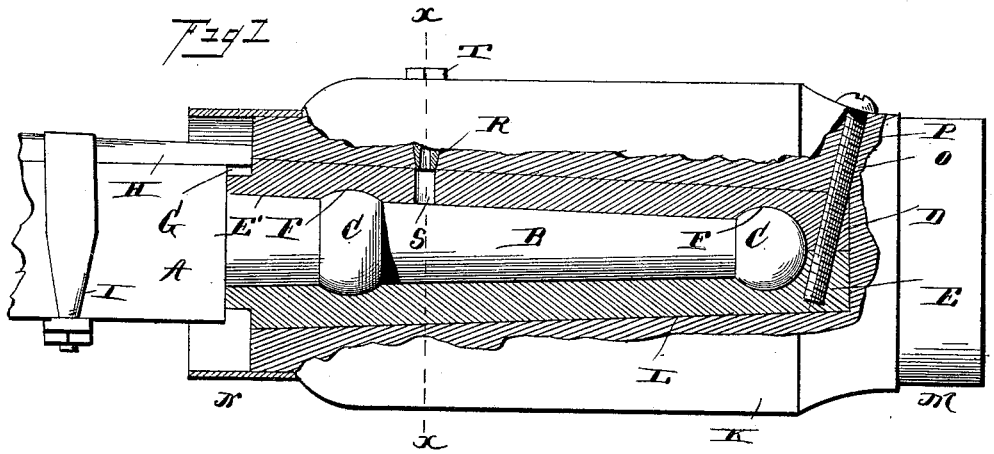
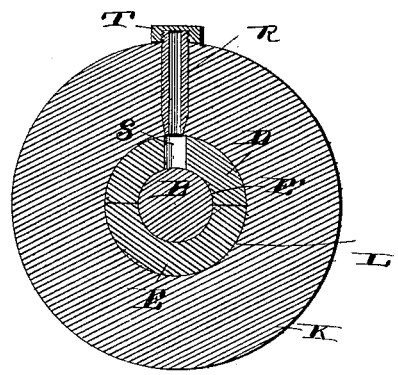
Witnesses
John Imirie
J. W. Garner
Inventor
Isaac M. Warner
By his Attorneys
C. A. Snow & Co.

UNITED STATES PATENT OFFICE.

ISAAC MADISON WARNER, OF BETHEL, MICHIGAN.

VEHICLE HUB AND AXLE.

SPECIFICATION forming part of Letters Patent No. 405,932, dated June 25, 1889.

Application filed February 7, 1889. Serial No. 298,987. (No model.)

*To all whom it may concern:*

Be it known that I, ISAAC MADISON WARNER, a citizen of the United States, residing at Bethel, in the county of Branch and State of Michigan, have invented a new and useful Improvement in Vehicle Hubs and Axles, of which the following is a specification.

My invention relates to an improvement in vehicle hubs and axles; and it consists in the peculiar construction and combination of devices that will be more fully set forth hereinafter, and particularly pointed out in the claims.

In the accompanying drawings, Figure 1 is an elevation, partly in section, of an axle-spindle and wheel-hub embodying my improvements. Fig. 2 is a sectional view of the same, taken on the line $x\ x$ of Fig. 1.

A represents the axle, which has the spindle B tapered toward its outer extremity and provided at its outer end and at a suitable distance from its inner end with spherical enlargements C.

D represents the axle-box, which is made in two longitudinally-separable sections E. Each of the said sections is provided with a tapered longitudinal opening E', adapted to receive the spindle, and is also provided with countersunk spherical recesses F to receive the balls or enlargements C of the spindle when the said sections of the box are closed together thereon, as shown.

At the inner end of the axle-box is an annular recess G, into which extends a wooden tree H, that is clamped on the upper side of the metallic portion of the axle by means of the clip-bolts I in the usual manner.

The hub K is provided with a longitudinal tapered opening L, in which the axle-box is adapted to be fitted. The outer end of the said opening is closed. The outer and inner ends of the hub are reduced in diameter, and are provided with metallic bands M N, which serve the usual purpose of preventing the wooden hub from spliting, and also impart an ornamental finish thereto. The inner band or ring N projects over the extending end of the tree H, and thereby forms a sand-band which prevents dirt and grit from entering the bearings. A transverse threaded opening O is made near the outer end of the hub, and a set-screw P is in the said opening, and has its inner end extending through one and engaging the other of the sections of the box, thereby securing the said box-sections to the hub, and consequently locking the same on the spindle, so that the wheel can by no possibility be removed from the spindle without first unscrewing the said screw P.

R represents a tube, which extends through a transverse opening in the hub near its inner end, and has its inner end communicating with an opening S in one of the sections of the box. The outer projecting end of the said tube is threaded, and a cap T is screwed thereon. The tube R serves as a means for introducing oil or other lubricant to the axle-spindle without the necessity of removing the wheel therefrom, it being only necessary to unscrew the cap T and pour the oil into the tube R when applying the lubricant to the wheel.

Having thus described my invention, I claim—

1. The combination of the axle having the spindle and the tree with its end projecting over the shoulder of the inner ends of the spindle, with the wheel having the box bearing on the spindle, and having the annular recess at its inner end, into which the projecting end of the tree extends, and the sand-band at the inner end of the hub extending over the projecting end of the tree, substantially as specified.

2. The tapered spindle having the spherical enlargements C, in combination with the box having the tapered bore adapted to engage the spindle and provided with countersunk recesses corresponding in form to the enlargements C, said box being formed of longitudinally-separable sections, the hub, and the transverse screw P, entering through and engaging aligned openings in the hub and in the separable sections of the axle-box, whereby the latter is held firmly in the hub, substantially as described.

3. The combination of the spindle having enlargements formed thereon, the longitudinally-divided axle-box having recesses to accommodate said enlargements, the hub secured upon the axle-box by means of a screw passing through said hub and through outer ends of the parts or sections of which said axle-box is composed, and a lubricating-tube extending transversely through one side of the hub and registering with a perforation in the axle-box, substantially as set forth.

4. The combination of the spindle having enlargements formed thereon, the longitudinally-divided axle-box having recesses to accommodate said enlargements, the non-perforate hub made solid at its outer end, and having a recess in its inner end to receive the axle-box, and a fastening-screw passing transversely through one side of the hub and through the sections composing the axle-box, which are thereby secured in the recess of the hub, substantially as set forth.

5. The combination of the spindle having enlargements formed thereon, the longitudinally-divided axle-box having recesses to accommodate said enlargements, the non-perforate hub made solid at its outer end and having a recess in its inner end to receive the axle-box, a fastening-screw passing transversely through one side of the hub and through the sections composing the axle-box, which are thereby secured in the recess of the hub, and a lubricating-tube extending through one side of the hub and registering with a perforation in the axle-box, substantially as set forth.

In testimony that I claim the foregoing as my own I have hereto affixed my signature in presence of two witnesses.

ISAAC MADISON WARNER.

Witnesses:
EGBERT NICHOLS,
AGNES GIBSON.